ABSTRACT OF THE DISCLOSURE

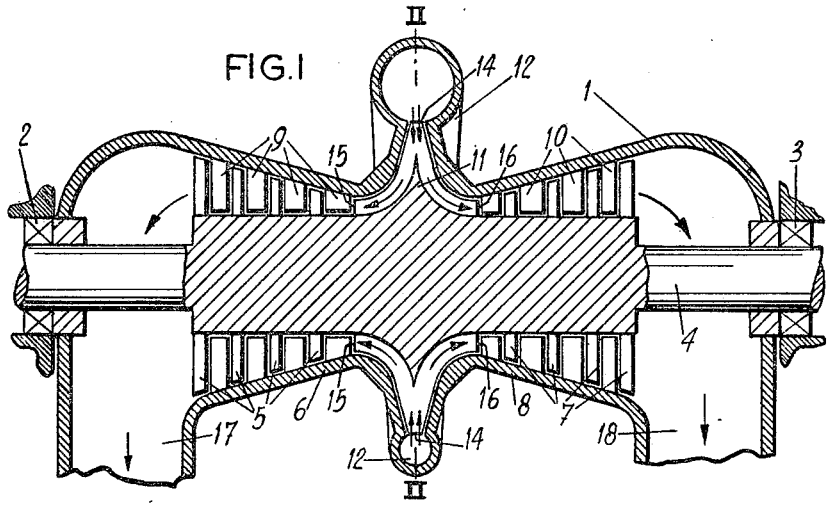
FIG.1
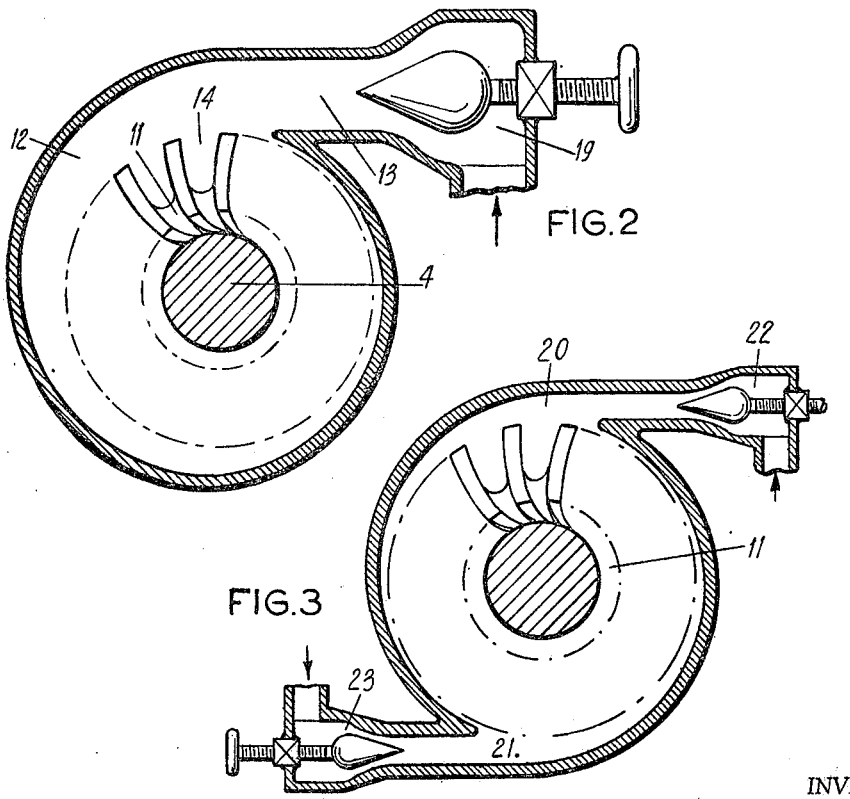
FIG.2
FIG.3
INVENTOR
RUDOLF HENDRIKS
BY *Nurie & Sailey*
ATTORNEY 3,479,124
TURBINE
Rudolf Hendriks, Hengelo, Netherlands, assignor to N.V. Koninklijke Machinefabriek Stork, Hengelo, Netherlands, a Dutch limited-liability company
Filed Sept. 20, 1967, Ser. No. 669,139
Claims priority, application Netherlands, Sept. 22, 1966, 6613385
Int. Cl. F01d 3/02
U.S. Cl. 415—159    4 Claims

A turbine with a centripetal stage which is surrounded by one or more distribution ducts. The driving fluid enters the duct with a high velocity, then flows through said duct with the same high velocity and enters the centripetal wheel along its whole circumference with said high velocity without passing any obstructions as guide vanes or the like. The cross sectional area of the duct decreases from the inlet end. The high velocity of the driving fluid is generated in an adjustable valve communicating with its outlet opening directly to the inlet end of the distribution duct.

---

The present invention relates to a turbine with one or more rotating wheels in which the driving fluid is flowing in centripetal (radial inward) direction through at least the rotating wheel of the first stage. In the known turbines of this kind the high velocity of the driving fluid entering the vanes of the rotating wheel, is obtained between guide vanes which are arranged in a circle around the rotating wheel. In such a turbine the centripetal rotating wheel can have a very high peripheral velocity, but when by increasing the pressure ratio over the turbine stage one will attain that the driving fluid enters the centripetal rotating wheel with a corresponding high velocity one has to do with large losses due to friction. Moreover the construction of the guide vanes will become very expensive.

The invention has for its object to provide a turbine of the above kind with a high efficiency by reducing the losses due to friction to a minimum. According to the invention the centripetal stage is surrounded by one or more distribution ducts to which the driving fluid is supplied, said ducts enclosing the centripetal rotating wheel and communicating along their whole inner circumference directly with the centripetal wheel, the cross sectional area of said ducts decreasing from the inlet end to the other end. In such a turbine the high velocity of the driving fluid required to apply a high rotational speed of the rotating wheel is generated at the inlet end of the distribution duct or ducts. The high velocity of the driving fluid is maintained in the distribution duct or ducts and the fluid enters the rotating wheel without meeting any obstacle as guide vanes or the like. By avoiding the use of guide vanes or the like not only the friction losses are reduced, but moreover the turbine becomes less expensive. As a result of the fact that the high velocity is already generated at the beginning of the distribution duct and that this velocity is maintained throughout the length of the duct, the cross sectional flow area can be rather small so that the turbine can be smaller, which gives a further reduction of the cost price.

According to the invention one or more adjustable valves with their outlet opening can be communicating directly to the inlet end of the distribution duct or ducts. In such an embodiment the high velocity of the driving fluid is generated in the adjustable valves, which are used for regulating the power of the turbine. Further there is only once a conversion of pressure in velocity so that the losses which are arising from a conversion of velocity in pressure are avoided.

The invention will be elucidated in the following description of two embodiments of a turbine read in conjunction with the accompanying drawings in which:

FIG. 1 is a schematical vertical axial section through a turbine in accordance with the invention;

FIG. 2 a section of the turbine of FIG. 1 taken along the line II—II of FIG. 1;

FIG. 3 a view similar to FIG. 2 showing a turbine in another embodiment.

In the embodiment of the turbine according to FIG. 1 in a casting 1 a rotor 4 is mounted in bearings 2 and 3. The rotor 4 is carrying rotating wheel 5 of an axial turbine portion 6 and rotating wheels 7 of an axial turbine portion 8. Between the rotating wheels 5 are arranged guide wheels 9 and between the rotating wheels 7 are arranged guide wheels 10. The rotor 4 is carrying in its center a centripetal rotating wheel 11. This rotating wheel 11 is enclosed by a distribution duct 12 to which a driving fluid can be supplied through the duct 13. The distribution duct 12 is connected over its whole inner circumference at 14 directly to the centripetal rotating wheel 11. At 15 the driving fluid can leave the centripetal wheel 11 and enter the axial turbine portion 6 through the adjacent guide wheel 9. At the other side of the centripetal rotating wheel 11 the driving fluid can enter the axial turbine portion 8 at 16 through a guide wheel 10. Through outlet connection 17 resp. 18 the driving fluid leaves the axial turbine portion 6 resp. 8.

The driving fluid is supplied to the duct 13 through a regulating valve 19. In the regulating valve 19 the driving fluid attains the required high velocity, said high velocity being maintained in the duct 13 and in the distribution duct 12. The driving fluid enters the rotating wheel 11 along its whole circumference without any obstacle in the form of guide vanes or the like being present.

The cross sectional area of the flow path through the distribution duct 12 decreases gradually from the inlet end to the other end so that in spite of the gradually decreasing quantity of fluid flowing through the duct 12 the velocity remains substantially the same. In all positions of the regulating valve 19 the driving fluid is entering the centripetal rotating wheel 11 along its whole circumference. In the distribution duct 12 the flow of the driving fluid is such that the tangential velocity component increases with decreasing radius. The value of the angle between the absolute velocity and the tangent to the periphery of the centripetal rotating wheel 11 depends on the magnitude of the volume of driving fluid flowing through the duct.

In the embodiment shown in FIG. 3 the distribution duct consists of two separate parts 20 and 21, which have been displaced in relation to each other over an angle of 180°. The driving fluid is supplied to these parts 20 resp. 21 through valve 22 resp. 23. The turbine in this embodiment operates in the same way as the turbine according to FIGS. 1 and 2.

What I claim is:

1. A turbine assembly adapted to be driven by pressurized fluid, comprising in combination:

an elongate casing having inwardly directed guide vanes and defining an axial passage for driving fluid, said casing having a circumferentially extending inlet slot for the introduction of driving fluid thereinto, an inlet manifold for said inlet slot, said manifold extending continuously around said casing and opening directly and uninterruptedly on its inner side with said inlet slot, said manifold having a tangential inlet portion and the cross section of said manifold decreasing from said tangential inlet portion circumferentially around said casing, a rotor in said casing having radially projecting blades cooperating with said guide vanes for converting axial flow of the driving fluid into rotor rotation, said rotor including a wheel portion having a series of blades having substantially radial outer end portions extending at least to said inlet manifold so that fluid in said manifold enters said wheel directly throughout the entire circumference thereof, and the main bodies of said blades extending curvilinearly inwardly to turn in the direction of said axial passage to direct incoming driving fluid from radial inward direction to axial direction, and an inlet manifold for said inlet slot, said manifold extending continuously circumferentially around said casing and opening directly and uninterruptedly on its inner side wtih said inlet slot, said manifold having a tangential inlet portion of relatively large cross section and the cross section of said manifold decreasing from said inlet portion circumferentially around said casing.

2. The turbine assembly defined in claim 1 wherein said inlet manifold is provided with a second tangential inlet portion diametrically of the first-mentioned inlet portion, both inlet portions being of relatively large cross sectional area and the inlet manifold decreasing in cross section from both said inlet portions circumferentially around said casing.

3. The turbine assembly as defined in claim 2 including a regulating valve in each of said inlet portions for generating a high velocity of the driving fluid at the inlet portion of said manifold.

4. The turbine assembly as defined in claim 1 including a regulating valve in said inlet portion for generating a high velocity of the driving fluid at the inlet portion of the manifold.

References Cited

UNITED STATES PATENTS

| 1,412,257 | 4/1922 | Petsche | 253—120 |
| 2,557,423 | 6/1951 | Fulpius | 253—136 |
| 3,107,084 | 10/1963 | Conrad et al. | 253—67 |

FOREIGN PATENTS

| 972,789 | 9/1950 | France. |
| 337,062 | 10/1930 | Great Britain. |
| 610,572 | 10/1948 | Great Britain. |
| 474,916 | 7/1951 | Canada. |

EVERETTE A. POWELL, JR., Primary Examiner

U.S. Cl. X.R.

415—95